(12) United States Patent
Ishihara et al.

(10) Patent No.: US 12,516,232 B2
(45) Date of Patent: Jan. 6, 2026

(54) CURED MATERIAL OF THERMAL CONDUCTIVE SILICONE COMPOSITION

(71) Applicant: SHIN-ETSU CHEMICAL CO., LTD., Tokyo (JP)

(72) Inventors: Yasuhisa Ishihara, Annaka (JP); Akihiro Endo, Annaka (JP); Katsuyuki Tanaka, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1222 days.

(21) Appl. No.: 17/296,291

(22) PCT Filed: Oct. 30, 2019

(86) PCT No.: PCT/JP2019/042685
§ 371 (c)(1),
(2) Date: Feb. 22, 2022

(87) PCT Pub. No.: WO2020/116057
PCT Pub. Date: Jun. 11, 2020

(65) Prior Publication Data
US 2022/0220354 A1   Jul. 14, 2022

(30) Foreign Application Priority Data
Dec. 4, 2018 (JP) ................................ 2018-227484

(51) Int. Cl.
| | |
|---|---|
| *C09K 5/14* | (2006.01) |
| *C08G 77/08* | (2006.01) |
| *C08G 77/12* | (2006.01) |
| *C08G 77/20* | (2006.01) |
| *C08K 3/22* | (2006.01) |
| *C08K 3/28* | (2006.01) |
| *C08K 7/18* | (2006.01) |
| *C08K 13/04* | (2006.01) |

(52) U.S. Cl.
CPC ............... *C09K 5/14* (2013.01); *C08G 77/08* (2013.01); *C08G 77/12* (2013.01); *C08G 77/20* (2013.01); *C08K 13/04* (2013.01); *C08K 2003/2227* (2013.01); *C08K 2003/282* (2013.01); *C08K 7/18* (2013.01); *C08K 2201/001* (2013.01); *C08K 2201/005* (2013.01); *C08K 2201/014* (2013.01)

(58) Field of Classification Search
CPC .......... C09K 5/14; C08G 77/08; C08G 77/12; C08G 77/20; C08K 13/04; C08K 7/18; C08K 2003/2227; C08K 2003/282; C08K 2201/001; C08K 2201/005; C08K 2201/014

See application file for complete search history.

(56) References Cited

U.S. PATENT DOCUMENTS

| | | | | |
|---|---|---|---|---|
| 5,011,870 | A | * | 4/1991 | Peterson ................... C08K 3/00 524/80 |
| 8,618,211 | B2 | * | 12/2013 | Bhagwagar ............... C09K 5/14 524/588 |
| 2019/0256756 | A1 | * | 8/2019 | Ishihara ................... C08K 13/04 |
| 2019/0292349 | A1 | * | 9/2019 | Ito ............................ C09K 5/10 |

FOREIGN PATENT DOCUMENTS

| | | | | |
|---|---|---|---|---|
| JP | H106-164174 | A |   | 6/1994 |
| JP | H07215707 | A | * | 8/1995 ........... C01B 21/072 |
| JP | 2001-158609 | A |   | 6/2001 |
| JP | 3256587 | B2 |   | 2/2002 |
| JP | 3957596 | B2 |   | 8/2007 |
| JP | 6246986 | B1 |   | 12/2017 |
| TW | 201823362 | A |   | 7/2018 |
| WO | WO-2017203924 | A1 | * | 11/2017 ............. C08G 77/12 |
| WO | WO-2018074247 | A1 | * | 4/2018 ............. C08G 77/04 |

OTHER PUBLICATIONS

WO 2018/074247 A1 translation. (Year: 2018).*
WO 2017/203924 A1 translation. (Year: 2017).*
JP H07215707 A translation. (Year: 1995).*
"Aluminium nitride information from Wikipedia", 2025. (Year: 2025).*
"Aluminium oxide information from Wikipedia", 2025. (Year: 2025).*
"Vinyl terminated Poly(dimethylsiloxane) from Sigma-Aldrich", 2025. (Year: 2025).*
Jun. 8, 2021 International Preliminary Report on Patentability issued in International Patent Application No. PCT/JP2019/042685.
Jul. 27, 2021 Office Action issued in Japanese Patent Application No. 2018-227484.
Jun. 1, 2022 Office Action issued in Chinese Patent Application 201980079476X.
Jan. 10, 2023 Office Action issued in Taiwanese Patent Application No. 108140015.
Nov. 9, 2024 Office Action issued in Korean Patent Application No. 10-2021-7016613.

(Continued)

*Primary Examiner* — Angela C Brown-Pettigrew
*Assistant Examiner* — Jiajia Janie Cai
(74) *Attorney, Agent, or Firm* — Oliff PLC

(57) ABSTRACT

The present invention is a cured material of a thermal conductive silicone composition, the composition containing: 6 to 40 volume % of an organopolysiloxane as a component (A), and 60 to 94 volume % of a heat conductive filler as a component (B), the heat conductive filler containing; (B-i) unsintered crushed aluminum nitride having an average particle size of 40 μm or more and having 1 mass % or less of a fine powder with a particle size of 5 μm or less, and (B-ii) a heat conductive material other than the unsintered crushed aluminum nitride having an average particle size of 1 μm or more, where the component (B-ii) content is 30 to 65 volume %. This provides a cured material of a thermal conductive silicone composition excellent in handling properties and having a high thermal conductivity.

11 Claims, No Drawings

(56) References Cited

OTHER PUBLICATIONS

Jul. 14, 2022 Extended European Search Report issued in European Patent Application No. 19891890.6.
Jan. 28, 2020 International Search Report issued in International Patent Application No. PCT/JP2019/042685.
Jul. 1, 2025 Office Action issued in Korean Patent Application No. 2021-7016613 (with partial translation).

* cited by examiner

CURED MATERIAL OF THERMAL CONDUCTIVE SILICONE COMPOSITION

TECHNICAL FIELD

The present invention relates to a cured material of a thermal conductive silicone composition.

BACKGROUND ART

LSI chips such as a CPU, driver IC, and memory used in electronic equipment such as a personal computer, a digital video disc player, and a mobile phone have come to generate a larger amount of heat by itself accompanying an advance in high performance, high speed, miniaturization, and high integration, and a temperature rise of a chip due to the heat causes malfunction and breakdown of the chip. Therefore, in order to suppress a temperature rise of the chip during operation, many heat dissipation methods and heat-dissipating members used for the methods have been proposed.

Recently, in electronic equipment and the like, heat sinks that employ a metal plate having a high thermal conductivity, such as one made of aluminum or copper, have been used to hold down the rise in chip temperature during operation. Such a heat sink carries away heat generated by the chips and discharges the heat from a surface by way of the temperature difference with outside air.

To efficiently transfer heat generated from the chips to the heat sink, it is necessary to place the heat sink in close contact with the chips. Because of height differences among the chips and the existence of tolerances due to assembly work, a sheet having flexibility or a grease is placed between the chips and the heat sink, and heat conduction from the chips to the heat sink is achieved through this sheet or grease (Patent Documents 1, 2, 3, and 4).

Sheets have excellent handling properties compared with grease, and thermal conductive sheets (thermal conductive silicone rubber sheets) formed from a thermal conductive silicone rubber or the like are used in various fields.

Thermal conductive sheets are often used especially when there is a certain amount of space between heat-generating devices and the cooling portion such as the heat sink or the casing. In addition, it is often necessary to ensure electrical insulation between the heat-generating devices and the heat sink or the casing, and insulation is also often required in thermal conductive sheets.

That is, particles of metal such as aluminum, copper, and silver cannot be used as a heat conductive filler, and insulating heat conductive fillers such as aluminum hydroxide and alumina are often used.

However, since aluminum hydroxide and alumina have low thermal conductivity themselves, a thermal conductive silicone composition using such a heat conductive filler has the lower thermal conductivity. Meanwhile, heat output by heat-generating devices has been steadily rising in recent years, and the thermal conductivity required in thermal conductive sheets has also been rising. Therefore, it has become difficult to respond to the requirement using aluminum hydroxide or alumina as a heat conductive filler.

CITATION LIST

Patent Literature

Patent Document 1: JP 3256587 B
Patent Document 2: JP 3957596 B
Patent Document 3: JP H6-164174 A
Patent Document 4: JP 6246986 B

SUMMARY OF INVENTION

Technical Problem

Accordingly, to achieve an even higher thermal conductivity, boron nitride and aluminum nitride have been attracting attention in recent years. Boron nitride has an extremely high thermal conductivity, but particles thereof have a flat shape, and therefore, anisotropy occurs in thermal conductivity when loaded in a silicone polymer to form a composition. On the other hand, particles of aluminum nitride do not have a flat shape, and therefore, anisotropy in thermal conductivity does not easily occur even when forming a composition.

There have been some reports of inventions where aluminum nitride is used as a heat conductive filler until now, but few examples have been reported that the filler is aluminum nitride having an average particle size of 50 μm or more. Generally, when the same amount of the same heat conductive filler is loaded in a base polymer, the thermal conductivity of the composition becomes higher as a heat conductive filler with a larger particle size is used. Therefore, aluminum nitride with as large a particle size as possible is often used.

In addition, aluminum nitride has poor filling property to a silicone polymer, and therefore, it is advantageous when loading, to make the surface area of the aluminum nitride as small as possible. It can be observed that it is preferable to use aluminum nitride with a large average particle size from this viewpoint as well.

The present invention has been made to solve the above-described problems, and an object thereof is to provide a cured material of a thermal conductive silicone composition excellent in handling properties and having a high thermal conductivity.

Solution to Problem

To solve the above-described problems, the present invention provides a cured material of a thermal conductive silicone composition, wherein
  the thermal conductive silicone composition comprises:
  6 to 40 volume % of an organopolysiloxane as a component (A), and
  60 to 94 volume % of a heat conductive filler as a component (B),
  the heat conductive filler comprising;
  (B-i) unsintered crushed aluminum nitride having an average particle size of 40 μm or more and having 1 mass % or less of a fine powder with a particle size of 5 μm or less, and
  (B-ii) a heat conductive material other than the unsintered crushed aluminum nitride having an average particle size of 1 μm or more, wherein
  the component (B-ii) content is 30 to 65 volume %.
The inventive cured material of a thermal conductive silicone composition can achieve excellent handling properties and high thermal conductivity.

The crushed aluminum nitride preferably contains, relative to one part by mass thereof,
  0.6 to 0.9 parts by mass of crushed aluminum nitride having an average particle size of 70 μm or more and less than 90 μm, and 0.1 to 0.4 parts by mass of crushed aluminum nitride having an average particle size of 40 μm or more and less than 70 μm.

Such a cured material can achieve more excellent handling properties and higher thermal conductivity.

Furthermore, the component (A) preferably contains an organopolysiloxane having at least two alkenyl groups in a molecule thereof, and the component (B) preferably contains;
- 16 to 19 volume % of (B-1) unsintered crushed aluminum nitride having an average particle size of 70 to 90 μm,
- 4 to 9 volume % of (B-2) unsintered crushed aluminum nitride having an average particle size of 40 to 60 μm,
- 5 to 9 volume % of (B-3) spherical alumina having an average particle size of 60 to 80 μm,
- 2 to 4 volume % of (B-4) spherical alumina having an average particle size of 35 to 55 μm,
- 16 to 20 volume % of (B-5) spherical alumina having an average particle size of 5 to 15 μm, and
- 21 to 29 volume % of (B-6) crushed alumina having an average particle size of 1 to 4 μm.

Combined skillfully heat conductive material of the heat conductive filler with average particle size thereof, such a cured material can therefore achieve even more excellent handling properties and higher thermal conductivity.

Furthermore, the present invention preferably further comprises 50 to 200 parts by mass of a component (C) relative to 100 parts by mass of the component (A), the component (C) being one or both of a component (C-1) and a component (C-2),
the component (C-1) being an alkoxysilane compound represented by the following general formula (1) and the component (C-2) being dimethylpolysiloxane represented by the following general formula (2) with one terminal of a molecular chain blocked with a trialkoxy group,

$$R^2_a R^3_b Si(OR^4)_{4-a-b} \quad (1)$$

wherein $R^2$ independently represents an alkyl group having 6 to 15 carbon atoms, $R^3$ independently represents an unsubstituted or substituted monovalent hydrocarbon group having 1 to 12 carbon atoms, $R^4$ represents an independent alkyl group having 1 to 6 carbon atoms, "a" represents an integer of 1 to 3, and "b" represents an integer of 0 to 2, where a+b is an integer of 1 to 3,

$$(2)$$

wherein $R^5$ independently represents an alkyl group having 1 to 6 carbon atoms, and "c" represents an integer of 5 to 100.

When such a component (C) is contained, the heat conductive filler can be hydrophobized during preparation of the composition to improve the wettability with the component (A) organopolysiloxane, so that the heat conductive filler can be dispersed uniformly in a matrix of the component (A).

Furthermore, the above-described cured material preferably has a thermal conductivity of 5 W/m·K or more.

Such a cured material has excellent thermal conductivity as a heat-dissipating member.

Furthermore, the cured material preferably has an Asker C hardness of 50 or less.

Such a cured material does not apply stress to a heat-generating member when being mounted, and follows the fine uneven shapes of a heat-generating member or a cooling member, so that thermal contact resistance becomes favorable.

Advantageous Effects of Invention

The thermal conductive silicone composition that gives the inventive cured material contains the heat conductive filler. The heat conductive filler contains unsintered crushed aluminum nitride and a heat conductive material other than the unsintered crushed aluminum nitride having different average particle sizes. The average particle sizes and volume ratios are skillfully combined to provide the thermal conductive silicone composition. Therefore, when an organopolysiloxane is further blended with the heat conductive filler to prepare a composition, viscosity does not become high, and the composition can be made uniform easily. In addition, the cured material of the obtained composition has flexibility so that the cured material does not apply stress to a heat-generating member, and can follow the fine uneven shapes of a heat-generating member or a cooling member, and has a high thermal conductivity. That is, the inventive cured material of a thermal conductive silicone composition has excellent handling properties and a high thermal conductivity. In particular, a cured material having a high thermal conductivity of 5 W/m·K or more can be provided, and can be used favorably as a thermal conductive resin molding (thermal conductive silicone cured material) placed between a heat-generating component and a heat-dissipating component in an electronic device and used for heat dissipation, for example. Specifically, the cured material is particularly useful as a thermal conductive material placed at an interface between a thermal boundary surface of a heat-generating electronic component and a heat-dissipating member such as a heat sink or a circuit board for the purpose of cooling the electronic component by heat conduction.

DESCRIPTION OF EMBODIMENTS

As described above, development of a cured material of a thermal conductive silicone composition having excellent handling properties and a high thermal conductivity has been desired.

The present inventors have earnestly studied the above problems and found out the following: when unsintered crushed aluminum nitride and a heat conductive material other than the unsintered crushed aluminum nitride having different average particle sizes are used as a heat conductive filler, and the average particle sizes and volume ratios are skillfully combined, viscosity does not become high, and the composition can be made uniform easily when an organopolysiloxane is further blended thereto to prepare a composition; and moreover, the cured material of the obtained composition has flexibility so that the cured material does not apply stress to a heat-generating member, and can follow the fine uneven shapes of a heat-generating member or a cooling member, and has a high thermal conductivity. Thus, the present invention has been completed.

That is, the present invention is a cured material of a thermal conductive silicone composition, wherein
the thermal conductive silicone composition comprises:
6 to 40 volume % of an organopolysiloxane as a component (A), and 60 to 94 volume % of a heat conductive filler as a component (B), the heat conductive filler comprising;

(B-i) unsintered crushed aluminum nitride having an average particle size of 40 μm or more and having 1 mass % or less of a fine powder with a particle size of 5 μm or less, and (B-ii) a heat conductive material other than the unsintered crushed aluminum nitride having an average particle size of 1 μm or more, wherein the component (B-ii) content is 30 to 65 volume %.

Hereinafter, the present invention will be described in detail. However, the present invention is not limited thereto.

The inventive cured material of a thermal conductive silicone composition is formed by curing a thermal conductive silicone composition containing an organopolysiloxane as a component (A) and a heat conductive filler as a component (B). Here, the heat conductive filler contains (B-i) unsintered crushed aluminum nitride having an average particle size of 40 μm or more and having 1 mass % or less of a fine powder with a particle size of 5 μm or less, and (B-ii) a heat conductive material having an average particle size of 1 μm or more other than the unsintered crushed aluminum nitride. Hereinafter, the components contained in the thermal conductive silicone composition that gives the inventive cured material will be described.

[Component (A): Organopolysiloxane]

The component (A) organopolysiloxane becomes the base of the thermal conductive silicone composition that gives the inventive cured material. The organopolysiloxane is not particularly limited as long as a cured material can be provided, but is preferably an organopolysiloxane having two or more alkenyl groups bonded to a silicon atom in one molecule thereof.

Usually, an organopolysiloxane generally has a main chain portion basically formed from repeating diorganosiloxane units. This may contain a branched structure in a part of the molecular structure, or may be cyclic, and in view of physical properties such as the mechanical strength of the cured material, a linear diorganopolysiloxane is preferable.

Examples of the functional groups other than the alkenyl group bonded to a silicon atom include unsubstituted or substituted monovalent hydrocarbon groups, for example, alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group, and a dodecyl group; cycloalkyl groups such as a cyclopentyl group, a cyclohexyl group, and a cycloheptyl group; aryl groups such as a phenyl group, a tolyl group, a xylyl group, a naphthyl group, and a biphenylyl group; aralkyl groups such as a benzyl group, a phenylethyl group, a phenylpropyl group, and a methylbenzyl group; and groups obtained by substituting a part or all of hydrogen atoms bonded to a carbon atom in these groups with a halogen atom such as fluorine, chlorine and bromine, or a cyano group, for example, a chloromethyl group, a 2-bromoethyl group, a 3-chloropropyl group, a 3,3,3-trifluoropropyl group, a chlorophenyl group, a fluorophenyl group, a cyanoethyl group, a 3,3,4,4,5,5,6,6,6-nonafluorohexyl group may be cited, typically, those having 1 to 10 carbon atoms, particularly typically, those having 1 to 6 carbon atoms, preferably, an unsubstituted or substituted alkyl group having 1 to 3 carbon atoms such as a methyl group, an ethyl group, a propyl group, a chloromethyl group, a bromoethyl group, a 3,3,3,-trifluoropropyl group, and a cyanoethyl group, and unsubstituted or substituted phenyl groups such as a phenyl group, a chlorophenyl group, and a fluorophenyl group. All functional groups other than the alkenyl group bonded to a silicon atom are not limited to be the same.

Examples of the alkenyl group usually include those having about 2 to 8 carbon atoms such as a vinyl group, an allyl group, a propenyl group, an isopropenyl group, a butenyl group, a hexenyl group, and a cyclohexenyl group. In particular, lower alkenyl groups such as a vinyl group and an allyl group are preferable, and a vinyl group is particularly preferable.

This organopolysiloxane preferably has a kinematic viscosity at 25° C. of 10 to 30000 mm$^2$/s, particularly preferably 50 to 1000 mm$^2$/s. When using an organopolysiloxane having a kinematic viscosity within this range, the flowability of the obtained composition is not lost, and the heat conductive filler can be filled easily.

One such component (A) organopolysiloxane can be used, or a combination of two or more thereof (for example, those having different viscosities) can be used.

The formulation amount of the component (A) organopolysiloxane is 6 to 40 volume % of the thermal conductive silicone composition, preferably 7 to 30 volume %.

[Component (B): Heat Conductive Filler]

In the present invention, (B-i) unsintered crushed aluminum nitride having an average particle size of 40 μm or more and having 1 mass % or less of a fine powder with a particle size of 5 μm or less, and (B-ii) a heat conductive material other than the unsintered crushed aluminum nitride having an average particle size of 1 μm or more are used as a heat conductive filler.

[Component (B-i): Unsintered Crushed Aluminum Nitride]

Aluminum nitride can be broadly divided into a sintered body and an unsintered body. A sintered body is a spherical particle, and therefore, has a more favorable filling property to a silicone polymer compared with an unsintered body. On the other hand, since several percent of yttria is added when sintering, an aluminum nitride phase and an yttria phase exist together, and a sintered body is inferior to an unsintered body regarding thermal conductivity. Furthermore, a sintered body becomes extremely expensive due to performing a sintering process. Therefore, unsintered crushed aluminum nitride is used as a heat conductive filler in the present invention. Note that aluminum nitride is known to be easier to load in a silicone polymer compared with boron nitride.

<Particle Size of Aluminum Nitride>

The present invention requires to use unsintered crushed aluminum nitride having an average particle size of 40 μm or more and having 1 mass % or less of a fine powder with a particle size of 5 μm or less as a component (B-i).

As described above, this aluminum nitride has poor filling property to a silicone polymer, and therefore, it is advantageous when loading, to make the surface area of the aluminum nitride as small as possible, and it is preferable to use aluminum nitride with a large average particle size.

With the same average particle size, it is effective to make the very fine fine-powder region with a particle size of 5 μm or less, for example as small as possible considering ensuring filling property, but this has not been considered much in the past. Furthermore, since flowability when loaded in a base polymer cannot be ensured with only aluminum nitride with an average particle size of 40 μm or more, heat conductive fillers with various particle sizes are sometimes used together. However, in this event, when using a heat conductive filler with too small an average particle size, a resultant composition becomes too viscous. Therefore, it is also necessary to consider the average particle sizes of the heat conductive fillers to be used together. If using a heat conductive filler having a small average particle size or containing a large amount of fine powder, it takes time until the base polymer and the heat conductive filler become uniform while preparing a composition. This is because the specific surface area of the heat conductive filler becomes large and it is difficult for the base polymer to distribute to the heat conductive filler.

In the present invention, unsintered crushed aluminum nitride (B-i) having different average particle sizes and a heat conductive material (B-ii) other than the unsintered crushed aluminum nitride are used as a heat conductive filler, and the average particle sizes and volume ratios are skillfully combined. This prevents a resultant composition becoming viscous. In addition, sufficient distribution of the base polymer to the heat conductive filler provides a uniform mixture of the two, and curing the resultant provides a cured material having a high thermal conductivity.

In the present invention, the average particle size (hereinafter, also simply referred to as "particle size") of the unsintered crushed aluminum nitride needs to be 40 µm or more, and is preferably 40 µm or more and 200 µm or less, more preferably 40 µm or more and 100 µm or less. If using a large amount of aluminum nitride with an average particle size of less than 40 µm, loading becomes difficult. Furthermore, as described above, when the same amount is loaded, the thermal conductivity of the obtained composition becomes higher as the particle size is larger. Therefore, particles with as large an average particle size as possible are used. When adding the particles with the average particle size of 200 µm or less to the composition, flowability is not lost.

In addition, the ratio of a fine powder region of aluminum nitride of 5 µm or less needs to be 1% or less, preferably 0.5% or less. If the ratio of the fine powder region exceeds 1%, loading an aluminum nitride powder with a relatively large surface area into a composition increases viscosity of the composition markedly.

The crushed aluminum nitride (B-i) preferably contains, relative to one part by mass thereof, 0.6 to 0.9 parts by mass of crushed aluminum nitride having an average particle size of 70 µm or more and less than 90 µm, and 0.1 to 0.4 parts by mass of crushed aluminum nitride having an average particle size of 40 µm or more and less than 70 µm.

With such a composition, the components (A) and (B) can be mixed (kneaded) easily and uniformly, and a cured material having a high thermal conductivity can be obtained.

[Component (B-ii)]

The component (B-ii) is a heat conductive material other than the above-described unsintered crushed aluminum nitride having an average particle size of 1 µm or more.

As the heat conductive filler other than the component (B-i), materials generally considered to be heat conductive fillers include non-magnetic metals such as copper and aluminum; metal oxides such as alumina, silica, magnesia, colcothar, beryllia, titania, and zirconia; metal nitrides such as aluminum nitride (other than (B-i)), silicon nitride, and boron nitride; metal hydroxides such as magnesium hydroxide; and artificial diamond and silicon carbide. In addition, an average particle size of 1 µm or more is sufficient, and a filler of 1 to 200 µm can be used. One or a composite of two or more kinds may be used. If a filler with an average particle size of less than 1 µm is contained, filling property becomes poor.

[Occupied Volume Ratio of Heat Conductive Filler]

The thermal conductive silicone composition contains 60 to 94 volume % of a heat conductive filler as a component (B), preferably 70 to 85 volume %. With less than 60 volume %, sufficient thermal conductivity cannot be achieved. Meanwhile, with more than 94 volume %, it becomes difficult to load to a base polymer.

The loaded amount of the component (B-ii) is 30 to 65 volume %, preferably 44 to 62 volume %, more preferably 40 to 60 volume %. If the loaded amount is less than 30 volume %, flowability when loaded in a base polymer cannot be ensured, and loading becomes difficult. Meanwhile, with more than 65 volume %, sufficient thermal conductivity cannot be achieved.

Note that the volume % of the above-described components is determined by the following calculation: determining the loaded amount (based on volume) of each component, with using the relative density thereof, from the loaded amount (based on mass) of each component that is silicone (relative density: 1.00), aluminum nitride (relative density: 3.26), and alumina (relative density: 3.98), and dividing the loaded amount (based on volume) by the total volume.

An example of a favorable constitution of the component (B) includes the following components in the following ratio.

(B-1) unsintered crushed aluminum nitride having an average particle size of 70 to 90 µm: 16 to 19 volume %, (B-2) unsintered crushed aluminum nitride having an average particle size of 40 to 60 µm: 4 to 9 volume %, (B-3) spherical alumina having an average particle size of 60 to 80 µm: 5 to 9 volume %, (B-4) spherical alumina having an average particle size of 35 to 55 µm: 2 to 4 volume %, (B-5) spherical alumina having an average particle size of 5 to 15 µm: 16 to 20 volume %, and (B-6) crushed alumina having an average particle size of 1 to 4 µm: 21 to 29 volume %.

With such a composition, the components (A) and (B) can be mixed (kneaded) easily and uniformly, and a cured material having a high thermal conductivity can be obtained.

[Component (C): Surface Treatment Agent]

A surface treatment agent can be blended in the composition of the present invention for the purpose of hydrophobizing the heat conductive filler (component (B)) during preparation of the composition, improving the wettability with the component (A) organopolysiloxane, and uniformly dispersing the heat conductive filler in a matrix of the component (A). As the component (C), one or both of the following components (C-1) and (C-2) are particularly preferable.

Component (C-1) is an alkoxysilane compound represented by the following general formula (1).

$$R^2_a R^3_b Si(OR^4)_{4-a-b} \quad (1)$$

(In the formula, $R^2$ independently represents an alkyl group having 6 to 15 carbon atoms, $R^3$ independently represents an unsubstituted or substituted monovalent hydrocarbon group having 1 to 12 carbon atoms, $R^4$ represents an independent alkyl group having 1 to 6 carbon atoms, "a" represents an integer of 1 to 3, and "b" represents an integer of 0 to 2, where a+b is an integer of 1 to 3.)

In the general formula (1), examples of the alkyl group represented by $R^2$ include a hexyl group, an octyl group, a nonyl group, a decyl group, a dodecyl group, and a tetradecyl group. When the number of carbon atoms of the alkyl group represented by $R^2$ satisfies the range of 6 to 15, the wettability to the component (A) is sufficiently improved, handling properties become excellent, and the low temperature characteristics of the composition become excellent.

Examples of the unsubstituted or substituted monovalent hydrocarbon group represented by $R^3$ include alkyl groups such as a methyl group, an ethyl group, a propyl group, an isopropyl group, a butyl group, an isobutyl group, a tert-butyl group, a pentyl group, a neopentyl group, a hexyl group, a heptyl group, an octyl group, a nonyl group, a decyl group, and a dodecyl group; cycloalkyl groups such as a cyclopentyl group, a cyclohexyl group, and a cycloheptyl group; aryl groups such as a phenyl group, a tolyl group, a xylyl group, a naphthyl group, and a biphenylyl group; aralkyl groups such as a benzyl group, a phenylethyl group, a phenylpropyl group, and a methylbenzyl group; and groups obtained by substituting a part or all of hydrogen atoms bonded to a carbon atom in these groups with a halogen atom such as fluorine, chlorine and bromine, or a cyano group, for example, a chloromethyl group, a 2-bromoethyl group, a 3-chloropropyl group, a 3,3,3-trifluoropropyl group, a chlorophenyl group, a fluorophenyl group, a cyanoethyl group, a 3,3,4,4,5,5,6,6,6-nonafluorohexyl group may be cited, typically, those having 1 to 10 carbon atoms, preferably 1 to 8, particularly typically, those having 1 to 6 carbon atoms, preferably, an unsubstituted or substituted alkyl group having 1 to 3 carbon atoms such as a methyl group, an ethyl group, a propyl group, a chloromethyl group, a bromoethyl group, a 3,3,3,-trifluoropropyl group, and a cyanoethyl group, and unsubstituted or substituted phenyl groups such as a phenyl group, a chlorophenyl group, and a fluorophenyl group. Examples of $R^4$ include a methyl group, an ethyl group, a propyl group, a butyl group, and a hexyl group.

Component (C-2) is a dimethylpolysiloxane represented by the following general formula (2) with one terminal of a molecular chain blocked with a trialkoxy group.

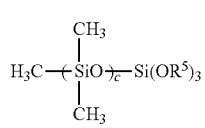

(2)

(In the formula, $R^5$ independently represents an alkyl group having 1 to 6 carbon atoms, and "c" represents an integer of 5 to 100.)

In the general formula (2), the alkyl group represented by $R^5$ is the same kind as the alkyl group represented by $R^4$ in the general formula (1).

As the surface treatment agent (component (C)) for the component (B), one of the component (C-1) and the component (C-2) or a combination of both is possible. In this case, 50 to 200 parts by mass of the component (C) is preferable, more preferably 50 to 170 parts by mass, and particularly preferably 50 to 150 parts by mass relative to 100 parts by mass of the component (A).

When the formulation amount is as described, the component (C) can hydrophobize the heat conductive filler (component (B)) sufficiently during preparation of the composition, so that wettability with the component (A) organopolysiloxane can be improved, and the heat conductive filler can be dispersed uniformly in a matrix of the component (A).

[Other Components]

In addition to the above-described components, other components can be further blended to the thermal conductive silicone composition as necessary.

For example, as a substance for promoting curing of the composition according to the curing method described below, an addition vulcanizing agent or an organic peroxide vulcanizing agent can be used.

Addition Vulcanizing Agent:

An addition vulcanizing agent is used when the above described composition is cured by an addition reaction, and contains a combination of an organohydrogenpolysiloxane (crosslinking agent) and a platinum group metal catalyst (hydrosilylation addition reaction catalyst). Examples of the platinum group metal catalyst include a simple substance of a platinum element, a platinum compound, a platinum composite, a chloroplatinic acid, an alcohol compound of a chloroplatinic acid, an aldehyde compound, an ether compound, complexes with various olefins, and the like. The platinum group metal catalyst is preferably added in an amount of 1 to 2,000 ppm relative to the component (A) organopolysiloxane in terms of the mass of platinum group metal atoms, preferably 2 to 1000 ppm (based on mass).

Meanwhile, the organohydrogenpolysiloxane used as an addition vulcanizing agent (crosslinking agent) has two or more hydrogen atoms bonded to a silicon atom (SiH groups) in one molecule thereof. The SiH groups in the organohydrogenpolysiloxane undergo a hydrosilylation addition reaction with the alkenyl groups bonded to the silicon atoms in the component (A), and the organohydrogenpolysiloxane acts as a crosslinking agent. There are no particular limits to the molecular structure of this organohydrogenpolysiloxane, and various types conventionally used such as linear, cyclic, branched, and three-dimensional network structure (resinous) can be used, for example. However, the organohydrogenpolysiloxane needs to have two or more hydrogen atoms bonded to a silicon atom (SiH groups) in one molecule thereof, preferably 2 to 200, more preferably 3 to 100. It is also possible to further add an addition reaction control agent.

Organic Peroxide Vulcanizing Agent:

An organic peroxide is used as the vulcanizing agent. Examples of the organic peroxide include benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butylperoxide, t-butylperbenzoate, 1,6-hexanediol-bis-t-butylperoxy carbonate, and the like. One of these may be used or two or more thereof may be used together.

The amount of the organic peroxide to be added may be a sufficient amount for curing the composition, but the amount is usually 0.1 to 10 parts by mass relative to 100 parts by mass of the component (A), particularly preferably 0.2 to 5 parts by mass.

[Preparation of Composition]

Methods for manufacturing the thermal conductive silicone composition are not particularly limited, but the thermal conductive silicone composition can be obtained by kneading predetermined amounts of the above-described components by using a known kneading apparatus such as two rollers, a kneader, or a Banbury mixer, for example. As necessary, a heat treatment (kneading under heating) may be performed.

[Molding and Curing Methods]

The method for molding the composition can be selected according to the required usage or molding. Specific examples include compression molding, injection molding, transfer molding, hot-air vulcanization under normal pressure, steam vulcanization, and the like.

In the present invention, a cured material is obtained by curing a thermal conductive silicone composition. Examples of the curing method include a method of using a platinum-based catalyst and the addition reaction of the alkenyl groups of the component (A) and Si—H groups, a method of using peroxide, a method of employing a condensation reaction, and the like. In the present invention, it is sufficient for the curing to proceed, and the curing method is not particularly limited. A curing component can be added as necessary.

[Curing Method Using Addition Reaction]

When a platinum-based catalyst, an organopolysiloxane containing alkenyl groups, and an organopolysiloxane having hydrogen atoms directly bonded to silicon are present together, an addition reaction takes place, and a silethylene chain is formed. A net-like crosslinked structure is formed by the addition reaction, and curing proceeds.

[Curing Method Using Peroxide]

Adding a peroxide, a radical is generated from the peroxide by heat or light, this becomes an initiator, organopolysiloxanes bond to each other, and curing proceeds.

[Curing Method Using Condensation Reaction]

An organopolysiloxane having a silanol group, a silane having a hydrolysable group, and a tin-based catalyst are essential components. Water in the air becomes an initiator, crosslink of the organopolysiloxane is formed, and curing proceeds.

[Curing Conditions]

The curing conditions are not particularly limited, and can be appropriately selected according to the curing method or molding. The curing conditions are generally 80 to 600° C., in particular, 100 to 450° C. for about several seconds to several days, in particular, 5 seconds to 1 hour. As necessary, a secondary vulcanization may be performed. A secondary vulcanization is usually at 180 to 250° C. for about 1 to 10 hours.

The inventive cured material obtained by such curing methods described above is, for example, disposed between a heat-generating component and a heat-dissipating component in an electronic device, and used for heat dissipation. Therefore, the inventive cured material preferably has the following thermal conductivity and hardness.

[Thermal Conductivity]

The thermal conductivity is preferably 5 W/m·K or more, more preferably 6 W/m·K or more. When the thermal conductivity is 5 W/m·K or more, the cured material has an excellent thermal conductivity as a heat-dissipating member. Incidentally, the thermal conductivity is measured by using a TPA-501 (manufactured by Kyoto Electronics Manufacturing Co., Ltd.).

[Hardness]

The Asker C hardness of the cured material of the thermal conductive silicone composition is preferably 50 or less, more preferably 5 or more and 50 or less, and particularly preferably 5 or more and 40 or less. When the Asker C hardness is 50 or less, stress does not become applied to the heat-generating component when mounting, the cured material can follow the fine uneven shapes of the heat-generating component or cooling component, and degradation of thermal contact resistance does not occur. When the Asker C is 5 or more, handling during mounting becomes easier, and there are no concerns for deformation or tear of the cured material.

The inventive cured material of the thermal conductive silicone composition can be widely used as a thermal conductive material that can be placed at an interface between a thermal boundary surface of a heat-generating electronic component and a heat-dissipating member such as a heat sink or a circuit board for the purpose of cooling the electronic component by heat conduction.

EXAMPLE

Hereinafter, the present invention will be specifically described with reference to Examples and Comparative Examples. However, the present invention is not limited thereto.

[Preparation of Composition]

Components (A) to (G) used in the following Examples and Comparative Examples are shown below. Note that the average particle size is a median diameter (d50) measured by a laser diffraction scattering method (measuring apparatus: Microtrac MT3000 (manufactured by MicrotracBEL Corp.)), and the amount of fine powder of 5 μm or less was calculated from the cumulative percentage of fine powder of 5 μm or less of the particle size cumulative distribution (based on volume) measured by the above apparatus. The occupied volume (ratio) in the Tables is a value (volume %) determined as follows: determining the loaded amount (based on volume) of each component from the loaded amount (based on mass) and the relative density of each component that is silicone (relative density: 1.00), aluminum nitride (relative density: 3.26), and alumina (relative density: 3.98); and dividing the loaded amount (based on volume) by the total volume.

Component (A): an organopolysiloxane represented by the following formula

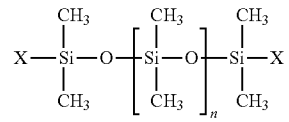

X represents a vinyl group, and "n" is a value that can achieve the following viscosity.

(A-1) viscosity: 100 mm²/s (A-2) viscosity: 600 mm²/s

Component (B):
- (B-1) unsintered crushed aluminum nitride having an average particle size of 80 μm and having 0.5 mass % of a fine powder of 5 μm or less
- (B-2) unsintered crushed aluminum nitride having an average particle size of 50 μm and having 0.4 mass % of a fine powder of 5 μm or less
- (B-1-1) unsintered crushed aluminum nitride having an average particle size of 80 μm and having 1.2 mass % of a fine powder of 5 μm or less
- (B-2-1) unsintered crushed aluminum nitride having an average particle size of 50 μm and having 1.8 mass % of a fine powder of 5 μm or less
- (B-3) spherical alumina having an average particle size of 70 μm
- (B-4) spherical alumina having an average particle size of 45 μm
- (B-5) spherical alumina having an average particle size of 10 μm
- (B-6) crushed alumina having an average particle size of 2 μm
- (B-6-1) crushed alumina having an average particle size of 0.7 μm
- (B-7) crushed aluminum hydroxide having an average particle size of 2 μm Component (C): Surface Treatment Agent
(C) dimethylpolysiloxane represented by the following formula with an average polymerization degree of 30, having one terminal blocked with a trimethoxysilyl group

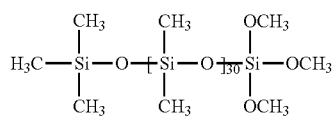
(3)

Other Components:
The following components (D) to (F) are components (addition vulcanizing agents) to be used in a curing method that uses addition reaction, and the component (G) is a component (organic peroxide vulcanizing agent) to be used in a curing method that uses a peroxide.

Component (D): Hydrogen Polysiloxane
(D) hydrogen polysiloxane represented by the following formula with the following average polymerization degree

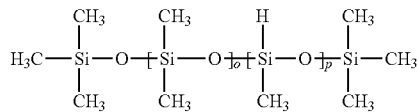
(4)

o=27, p=3

Component (E): Platinum Group Metal Catalyst
(E) A 2-ethyl hexanol solution of 5% chloroplatinic acid Component (F): Addition Reaction Control Agent
(F) Ethynyl methylidene carbinol Component (G): Peroxide Curing Agent
(G) C-23N (paramethylbenzoyl peroxide: manufactured by Shin-Etsu Chemical Co., Ltd.)

The above-described components (A) to (G) were kneaded with a planetary mixer for 60 minutes in respective formulation amounts of Examples 1 to 4 and Comparative Examples 1 to 4 shown in Tables 1 and 2 to obtain a thermal conductive silicone composition. Note that the formulation amounts of the components in the Tables are in parts by mass.

[Molding Method]
The obtained composition was flowed into a metal mold and molded (cured) with a press molding machine at 120° C. for 10 minutes.

[Evaluation Method]
Viscosity of composition: the viscosity of the obtained composition was measured by using a rheometer viscometer at a rotation number of 10 Hz.

Thermal conductivity: the obtained composition was cured into a sheet having a thickness of 6 mm, and two such sheets were used to measure the thermal conductivity of the sheet by using a thermal conductivity meter (TPA-501, product name, manufactured by Kyoto Electronics Manufacturing Co., Ltd.).

Hardness: the obtained composition was cured into a sheet having a thickness of 6 mm, and two such sheets were overlapped and measured with an Asker C Hardness Meter.

Time until uniform: the time until the components became uniform (until the components became a paste (semi-solid, semi-fluid)) when kneading with a planetary mixer was measured.

TABLE 1

| | | Example | | | |
|---|---|---|---|---|---|
| Component | | 1 | 2 | 3 | 4 |
| A | A-1 | — | 100 | — | 100 |
| | A-2 | 100 | — | 100 | — |
| B | B-1 | 810 | 800 | 1000 | — |
| | B-2 | 270 | 270 | 1000 | 600 |
| | B-3 | 400 | 430 | 700 | 200 |
| | B-4 | 135 | 4400 | 1600 | 200 |
| | B-5 | 970 | 650 | — | 400 |
| | B-6 | 1510 | — | — | 900 |
| C | | 150 | 150 | 150 | 100 |
| D | | 12 | 10 | — | 12 |
| E | | 1.35 | 1.35 | — | 1.5 |
| F | | 0.3 | 0.3 | — | 0.3 |
| G | | — | — | 0.5 | — |
| Occupied volume of heat conductive filler (volume %) | | 80.5 | 83.4 | 82.6 | 74.3 |
| Occupied volume of aluminum nitride (volume %) | | 24.5 | 24 | 42 | 23 |
| Occupied volume of other than aluminum nitride (volume %) | | 56.0 | 59.4 | 40.6 | 51.3 |
| Viscosity of composition (Pa · s) | | 250 | 300 | 350 | 190 |
| Thermal conductivity (W/m · K) | | 7.2 | 6.7 | 10 | 5.8 |
| Hardness (Asker C) | | 15 | 30 | 40 | 10 |
| Time until uniform (minutes) | | 12 | 14 | 15 | 10 |

The occupied ratio (volume %) of components A and B in Example 1 are as follows.
A-1: 7.4, B-1: 18.4, B-2: 6.1, B-3: 7.4,
B-4: 2.5, B-5: 18.0, B-6: 28.1

TABLE 2

| | | Comparative Example | | | |
|---|---|---|---|---|---|
| Component | | 1 | 2 | 3 | 4 |
| A | A-1 | — | — | — | 100 |
| | A-2 | 100 | 100 | 100 | — |
| B | B-1 | 810 | — | — | 2000 |
| | B-1-1 | | 810 | | |
| | B-2 | 270 | | — | |
| | B-2-1 | | 270 | | |
| | B-3 | 400 | 400 | 1200 | 100 |
| | B-4 | 135 | 135 | 1600 | 200 |
| | B-5 | 970 | 970 | — | 400 |
| | B-6 | — | 1510 | — | 900 |
| | B-6-1 | 1510 | — | 1500 | — |
| C | | 150 | 150 | 150 | 150 |
| D | | 12 | 12 | — | 12 |
| E | | 1.35 | 1.35 | — | 1.35 |
| F | | 0.3 | 0.3 | — | 0.3 |
| G | | — | — | 0.5 | — |
| Occupied volume of heat conductive filler (volume %) | | 80.5 | 80.5 | 81.2 | 85.4 |
| Occupied volume of aluminum nitride (volume %) | | 24 | 24 | 0 | 56 |
| Occupied volume of other than aluminum nitride (volume %) | | 56.5 | 56.5 | 81.2 | 29.4 |
| Viscosity of composition (Ps · s) | | 290 | 340 | 200 | — |
| Thermal conductivity (W/m · K) | | 7.2 | 7.1 | 4.9 | — |
| Hardness (Asker C) | | 17 | 26 | 40 | — |
| Time until uniform (minutes) | | 25 | 20 | 18 | — |

Examples 1 to 4 and Comparative Examples 1 to 4

Regarding the thermal conductive silicone compositions of Examples 1 to 4, viscosity did not become high during preparation (mixing), and the time until the base polymer and the heat conductive filler became uniform was short (15 minutes or less). In addition, the cured materials (the present invention) thereof had excellent handling properties, suitable hardness, and high thermal conductivity.

On the other hand, in Comparative Example 1, where the filler with the smallest average particle size (crushed alumina (B-6)) of the heat conductive fillers used in Example 1 was changed to a filler with an average particle size of less than 1 μm (B-6-1), the thermal conductivity and the Asker C hardness were of the same level. However, viscosity of the composition became high compared with Example 1, and it took more than twice as much time until the composition was uniform. In Comparative Example 2, where the component (B-i) of the heat conductive fillers used in Example 1 was changed to aluminum nitride ((B-1-1), (B-2-1)) containing 1% or more fine powder of 5 μm or less, the thermal conductivity was of the same level. However, viscosity of the composition became about 1.4 times that of Example 1, and it took about 1.7 times as much time until the composition was uniform. As described, if viscosity of the composition is high, flow property of the composition at the time of molding and flexibility of the cured material are degraded.

Meanwhile, in the case of Comparative Example 3, where the aluminum nitride of the heat conductive fillers used in Example 3 was changed to a component (B-ii) other than the aluminum nitride (that is, aluminum nitride was not used), the occupied volume ratio of the heat conductive filler was of the level as Example 3. However, thermal conductivity did not amount to half that of Example 3, and sufficient thermal conductivity was not achieved. In contrast, if the loaded amount of aluminum nitride is too large as in Comparative Example 4, loading becomes difficult, and a composition cannot be formed.

As described above, if the conditions deviate from the conditions (material, average particle size, amount of fine powder, and occupied volume %) of the thermal conductive silicone composition that give the inventive cured material, handling becomes difficult, and high thermal conductivity cannot be achieved.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A cured material of a thermal conductive silicone composition, wherein
the thermal conductive silicone composition comprises:
6 to 40 volume % of an organopolysiloxane as a component (A), and
60 to 94 volume % of a heat conductive filler as a component (B),
the heat conductive filler comprising:
(B-i) unsintered crushed aluminum nitride having an average particle size of 40 μm or more and having 1 mass % or less of a fine powder with a particle size of 5 μm or less, and
(B-ii) a heat conductive material other than the unsintered crushed aluminum nitride having an average particle size of 1 μm or more,
wherein
the component (B-ii) content is 30 to 65 volume % based on the total volume of the silicone composition, and
wherein the crushed aluminum nitride contains, relative to one part by mass of the total amount of the crushed aluminum nitride:
0.6 to 0.9 parts by mass of crushed aluminum nitride having an average particle size of 70 μm or more and less than 90 μm, and
0.1 to 0.4 parts by mass of crushed aluminum nitride having an average particle size of 40 μm or more and less than 70 μm.

2. The cured material of the thermal conductive silicone composition according to claim 1, wherein the component (A) contains an organopolysiloxane having two or more alkenyl groups in a molecule thereof, and the component (B) contains:
16 to 19 volume % of (B-1) unsintered crushed aluminum nitride having an average particle size of 70 to 90 μm,
4 to 9 volume % of (B-2) unsintered crushed aluminum nitride having an average particle size of 40 to 60 μm,
5 to 9 volume % of (B-3) spherical alumina having an average particle size of 60 to 80 μm,
2 to 4 volume % of (B-4) spherical alumina having an average particle size of 35 to 55 μm,
16 to 20 volume % of (B-5) spherical alumina having an average particle size of 5 to 15 μm, and
21 to 29 volume % of (B-6) crushed alumina having an average particle size of 1 to 4 μm, based on the total volume of the silicone composition.

3. The cured material of the thermal conductive silicone composition according to claim 1, further comprising 50 to 200 parts by mass of a component (C) relative to 100 parts by mass of the component (A), the component (C) being one or both of a component (C-1) and a component (C-2),
the component (C-1) being an alkoxysilane compound represented by the following general formula (1) and the component (C-2) being dimethylpolysiloxane represented by the following general formula (2) with one terminal of a molecular chain blocked with a trialkoxy group,

$$R^2_a R^3_b Si(OR^4)_{4-a-b} \quad (1)$$

wherein $R^2$ independently represents an alkyl group having 6 to 15 carbon atoms, $R^3$ independently represents an unsubstituted or substituted monovalent hydrocarbon group having 1 to 12 carbon atoms, $R^4$ represents an independent alkyl group having 1 to 6 carbon atoms, "a" represents an integer of 1 to 3, and "b" represents an integer of 0 to 2, where a+b is an integer of 1 to 3,

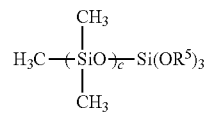

$$(2)$$

wherein $R^5$ independently represents an alkyl group having 1 to 6 carbon atoms, and "c" represents an integer of 5 to 100.

4. The cured material of the thermal conductive silicone composition according to claim 2, further comprising 50 to 200 parts by mass of a component (C) relative to 100 parts by mass of the component (A), the component (C) being one or both of a component (C-1) and a component (C-2), the component (C-1) being an alkoxysilane compound represented by the following general formula (1) and the component (C-2) being dimethylpolysiloxane represented by the following general formula (2) with one terminal of a molecular chain blocked with a trialkoxy group, $$R^2_a R^3_b Si(OR^4)_{4-a-b} \tag{1}$$

wherein $R^2$ independently represents an alkyl group having 6 to 15 carbon atoms, $R^3$ independently represents an unsubstituted or substituted monovalent hydrocarbon group having 1 to 12 carbon atoms, $R^4$ represents an independent alkyl group having 1 to 6 carbon atoms, "a" represents an integer of 1 to 3, and "b" represents an integer of 0 to 2, where a+b is an integer of 1 to 3,

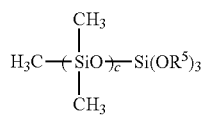

(2)

wherein $R^5$ independently represents an alkyl group having 1 to 6 carbon atoms, and "c" represents an integer of 5 to 100.

5. The cured material of the thermal conductive silicone composition according to claim 1, having a thermal conductivity of 5 W/m·K or more.

6. The cured material of the thermal conductive silicone composition according to claim 2, having a thermal conductivity of 5 W/m·K or more.

7. The cured material of the thermal conductive silicone composition according to claim 3, having a thermal conductivity of 5 W/m·K or more.

8. The cured material of the thermal conductive silicone composition according to claim 1, having an Asker C hardness of 50 or less.

9. The cured material of the thermal conductive silicone composition according to claim 2, having an Asker C hardness of 50 or less.

10. The cured material of the thermal conductive silicone composition according to claim 3, having an Asker C hardness of 50 or less.

11. The cured material of the thermal conductive silicone composition according to claim 5, having an Asker C hardness of 50 or less.

\* \* \* \* \*